(12) United States Patent
Zou et al.

(10) Patent No.: US 10,983,908 B1
(45) Date of Patent: Apr. 20, 2021

(54) METHOD AND SYSTEM FOR GARBAGE COLLECTION OF DATA PROTECTION VIRTUAL MACHINES IN CLOUD COMPUTING NETWORKS

(71) Applicant: EMC IP Holding Company LLC, Hopkinton, MA (US)

(72) Inventors: Colin Zou, Beijing (CN); Assaf Natanzon, Tel Aviv (IL); Man Lv, Beijing (CN); Oliver Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 203 days.

(21) Appl. No.: 15/649,139

(22) Filed: Jul. 13, 2017

(51) Int. Cl.
*G06F 12/02* (2006.01)
*G06F 11/14* (2006.01)
*H04L 29/08* (2006.01)
*G06F 3/06* (2006.01)
*H04L 29/06* (2006.01)

(52) U.S. Cl.
CPC ...... *G06F 12/0253* (2013.01); *G06F 11/1453* (2013.01); *H04L 67/1097* (2013.01); *G06F 3/0641* (2013.01); *G06F 3/0643* (2013.01); *G06F 12/0238* (2013.01); *H04L 63/08* (2013.01)

(58) Field of Classification Search
CPC ............ G06F 12/0253; G06F 11/1453; G06F 12/0238; G06F 3/0641; G06F 3/0643; H04L 67/1097; H04L 63/08

USPC .................................................. 707/600–899
See application file for complete search history.

(56) References Cited

U.S. PATENT DOCUMENTS

| 9,009,742 B1* | 4/2015 | Fair ....................... G06F 3/0664 719/330 |
| 2012/0030260 A1* | 2/2012 | Lu ........................ G06F 11/1453 707/820 |
| 2015/0227602 A1* | 8/2015 | Ramu .................... G06F 16/27 707/634 |
| 2017/0091232 A1* | 3/2017 | Ghanbari .............. G06F 16/215 |

OTHER PUBLICATIONS

M. Factor, K. Meth, D. Naor, O. Rodeh and J. Satran, "Object storage: the future building block for storage systems," 2005 IEEE International Symposium on Mass Storage Systems and Technology, Sardinia, Italy, 2005, pp. 119-123, doi: 10.1109/LGDI.2005.1612479. (Year: 2005).*

* cited by examiner

*Primary Examiner* — Anhtai V Tran
*Assistant Examiner* — Xiaoqin Hu
(74) *Attorney, Agent, or Firm* — Staniford Tomita LLP (57) ABSTRACT

Configuring virtual machines for garbage collection in a deduplication backup system executed on a server computer in a cloud computing network, by configuring at least one virtual machine (VM) of a plurality of virtual machines in a VM cluster to be data protection virtual machines (DP VMs), by enabling only read and write operations to/from the DP VMs, interconnecting a garbage collection VM (GC VM) of the VM cluster to the DP VMs, configuring the GC VM to perform only garbage collection tasks for the DP VMs, and providing data access credentials from each DP VM to the GC VM to facilitate the garbage collection tasks.

18 Claims, 7 Drawing Sheets

```
┌─────────────────────────────────────┐
│ For New User Data, DP VM Appends New Data │
│      Segments and Metadata          │
│                502                  │
└─────────────────────────────────────┘
                 ↓
┌─────────────────────────────────────┐
│  GC VM Reads/Scans Data for Analysis and │
│     Notifies DP VM of Dead Objects  │
│                504                  │
└─────────────────────────────────────┘
                 ↓
┌─────────────────────────────────────┐
│ GC VM Re-packs Data Segments into New Data │
│   Objects Without Updating Metadata │
│                506                  │
└─────────────────────────────────────┘
                 ↓
┌─────────────────────────────────────┐
│ DP VM Receives Dead and Re-Packed Objects │
│ and Erases Dead Objects and Updates Metadata │
│                508                  │
└─────────────────────────────────────┘
```

METHOD AND SYSTEM FOR GARBAGE COLLECTION OF DATA PROTECTION VIRTUAL MACHINES IN CLOUD COMPUTING NETWORKS

TECHNICAL FIELD

This invention relates generally to data protection, and more particularly to systems and methods for garbage collection of data protection virtual machines in cloud computing networks.

BACKGROUND OF THE INVENTION

For many enterprise-level data protection systems, vendors are increasingly moving to cloud-network based backup solutions. In these new systems, virtual appliances in the cloud are developed for customer, Similar to existing physical PBBA (Purpose Built Backup Appliance), data protection virtual machines (VMs) in the cloud are used to backup data from application V Ms like database servers, e-mail servers, file servers, and so on. Different PBBA vendors often provide different file systems.

A major disadvantage of such garbage collection mechanisms is that it imposes high costs on system resources. With respect to memory resources, one common deduplication system may use up to one-third of overall system memory for garbage collection. Such memory use is required because the middle scan results need to be kept in memory for analyzing data references and re-distributing data segments in disk. Garbage collection also increases disk input/output operations (TOPS) as it scans all data and also rewrite data during redistributing data after removing some of them. Although garbage collection is a usually a background job, processor (CPU) cycles are also increased since garbage collection needs to be performed fast enough in cases where the system needs to free space for newly ingested data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
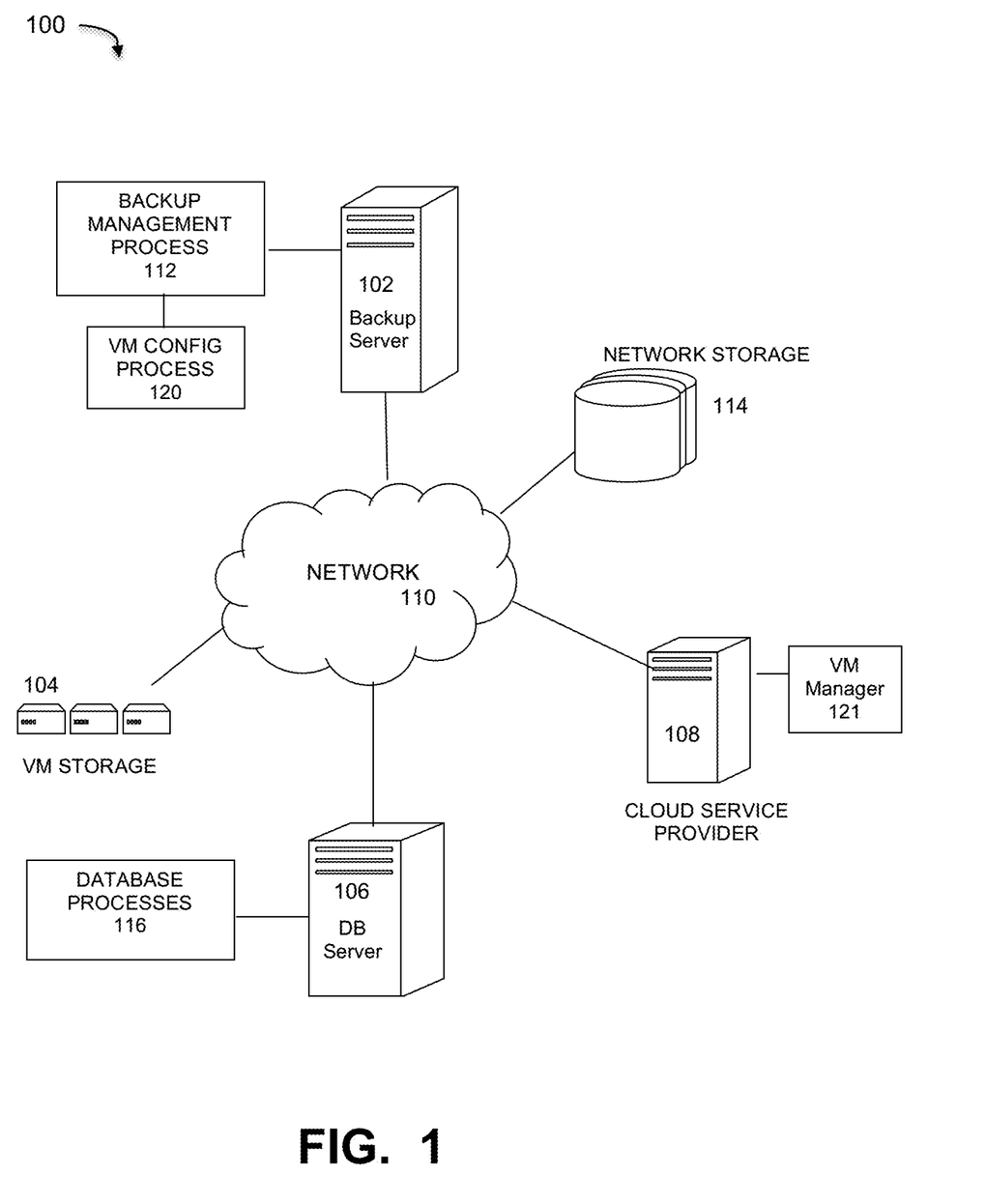
FIG. 1 is a diagram of a cloud computing network implementing a garbage collection method for data protection in virtual machine file systems, under some embodiments.

FIG. 1 is a diagram of a cloud computing network implementing a garbage collection method for data protection in virtual machine file systems, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114.

The network server computers are coupled directly or indirectly to the target VMs 104 and 106, and to the data source 108 through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system, and the data may reside on one or more hard drives (e.g., 118) for the database(s) in a variety of formats.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery.

In an embodiment, cloud network 110 may be a private network or it may be a public network provided by a third-party cloud service provider (CSP). In this case, at least part of the infrastructure of network 110, such as servers, routers, interfaces and so on are provided to users such as backup server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud provider 108 may be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier will have one or more cloud units that are used for data migration and storage using migration, copying, duplication, long-term retention (LTR), and other processes. In cloud-based environments, different cloud providers have different data centers, limits and operating parameters, such as TOPS, request limits, and so on. The number of connections is not fixed among cloud providers or even within each cloud provider. Despite SLA requirements, users cannot always assume that a cloud provider will always provide a certain number of connections. Therefore, it is important that memory and IOPs resources be efficiently managed by VMs in large-scale networks performing data-intensive tasks.

The data generated or sourced by system 100 and transmitted over network 110 may be stored in any number of persistent storage locations and devices, such as local client storage, server storage, or other network storage. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system, and the data may reside on one or more hard drives (e.g., 114) for the database(s) in a variety of formats. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In an embodiment, the storage 114 is an object storage that is provided as a service in the cloud network. Object storage (or object-based storage) is a storage architecture that manages data as objects, as opposed to file systems that manage data as a file hierarchy and block storage that manages data as blocks within sectors and tracks. Each object typically includes the data itself, a variable amount of metadata and a globally unique identifier. Each data segment is thus stored as an object with a unique object_id (e.g., 64 bit). When the data is later accessed, it is referenced by the ID instead of a layered (hierarchical) file name. Object storage can be implemented at multiple levels, including device level, system level, and interface level. In a cloud network, object storage is typically provided as a service in a public cloud from a cloud vendor, and it can be accessed by multiple VMs when credentials and policies apply.

Cloud networks provide multiple types of VM instances regarded as different CPU/MEM/IO characters. Not only can the VM instances be different, the pricing of VMs from the cloud service providers can also be different. As stated above, in many current systems, the garbage collection task is performed within each data protection VM. Even though garbage collection may not be performed all the time, VM resources must still be reserved for it. This is due to the fact that there are no present mechanisms to dynamically allocate resource to within VMs when garbage collection is needed. One issue with constantly reserving resources for garbage collection is memory usage. Garbage collection consumes system memory and it is one of the notable factors impacts scaling capacity per VM, as VMs typically do not have large memory size comparing with physical systems. For example, in a Data Domain physical PBBA supporting 1PB (petabyte) capacity, hundreds of GB (gigabyte) memory is reserved specific for garbage collection. Though dynamically adding memory in run-time is possible in theory, this requires software support in OS and also the file system at the application level, making this a very complicated solution. It should be noted that at present a 1PB capacity VM may represent a high-end configuration, and more typical sizes are on the order of 96 TB for a VM.

Another issue is that garbage collection requires IOPS while VMs may not be able to provide IOPS at a good price. The IOPS capability can be calculated by the number of disk spindles in the storage media (e.g., disk drives of the object storage). In the physical PBBA case, a system may have many disk spindles. For example, a high-end PBBA supporting 1PB capacity may need about 300 disk spindles to provide enough IOPS. Besides the read/write workload, GC is also a notable factor in consuming IOPS. In the case where writing and removing operations occur simultaneously and near the system capacity limit, garbage collection must be done quick enough to free disk space.

In many VM deployments, cloud vendors 108 provide certain IOPS for certain VMs at different prices. These often relate to the SLAs that users have with the vendors. High IOPS VMs are usually priced much higher as they are mostly supported by SSDs or cache technologies, which are much more expensive than standard disk storage. VMs requiring more HW resources not optimum for deployment and micro services.

Figure 2A:
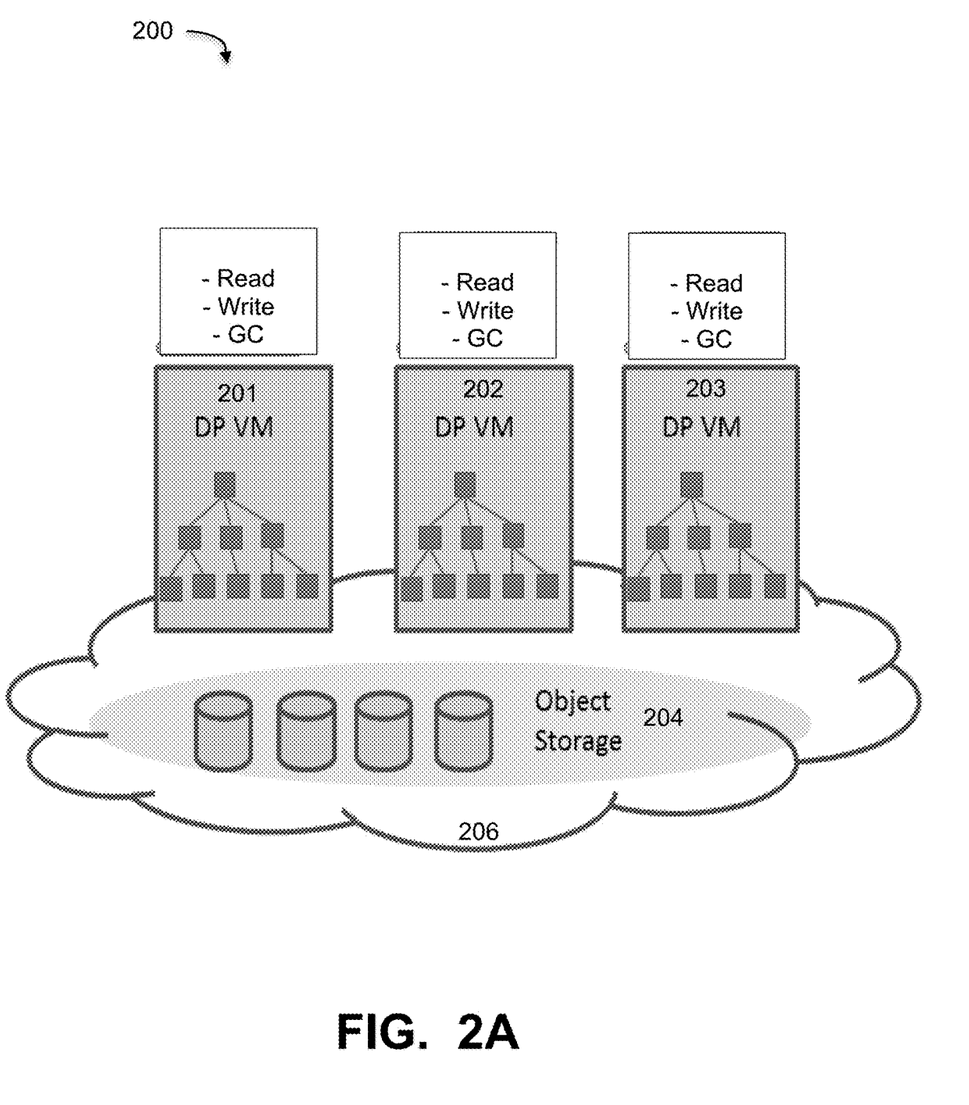
FIG. 2A illustrates a cloud network system having multiple data protection virtual machines (DP VMs) that implements a dedicated garbage collection (GC) function, under some embodiments.

FIG. 2A illustrates a cloud network system having multiple data protection VMs that implements a dedicated GC function, under some embodiments. As shown in FIG. 2A a VM deployment may comprise a number of VMs 201-203 coupled to storage media 204 within cloud network 206. The storage may represent an object storage system. Each VM may be configured to perform certain data processing tasks, such as data protection (DP) using deduplicating backup executables. For the example embodiment of FIG. 2A, each VM 201-203 performs the read/write operations as well as the garbage collection function. Even if no garbage collection is performed, VM resources such as memory and IOPs must be reserved for this function. Thus, garbage collection performed inside each DP VM, as shown in diagram 200 requires that each single VM 201-203 requires more memory and TOPS compared with the case that a VM that does not need to perform garbage collection.

Figure 2B:
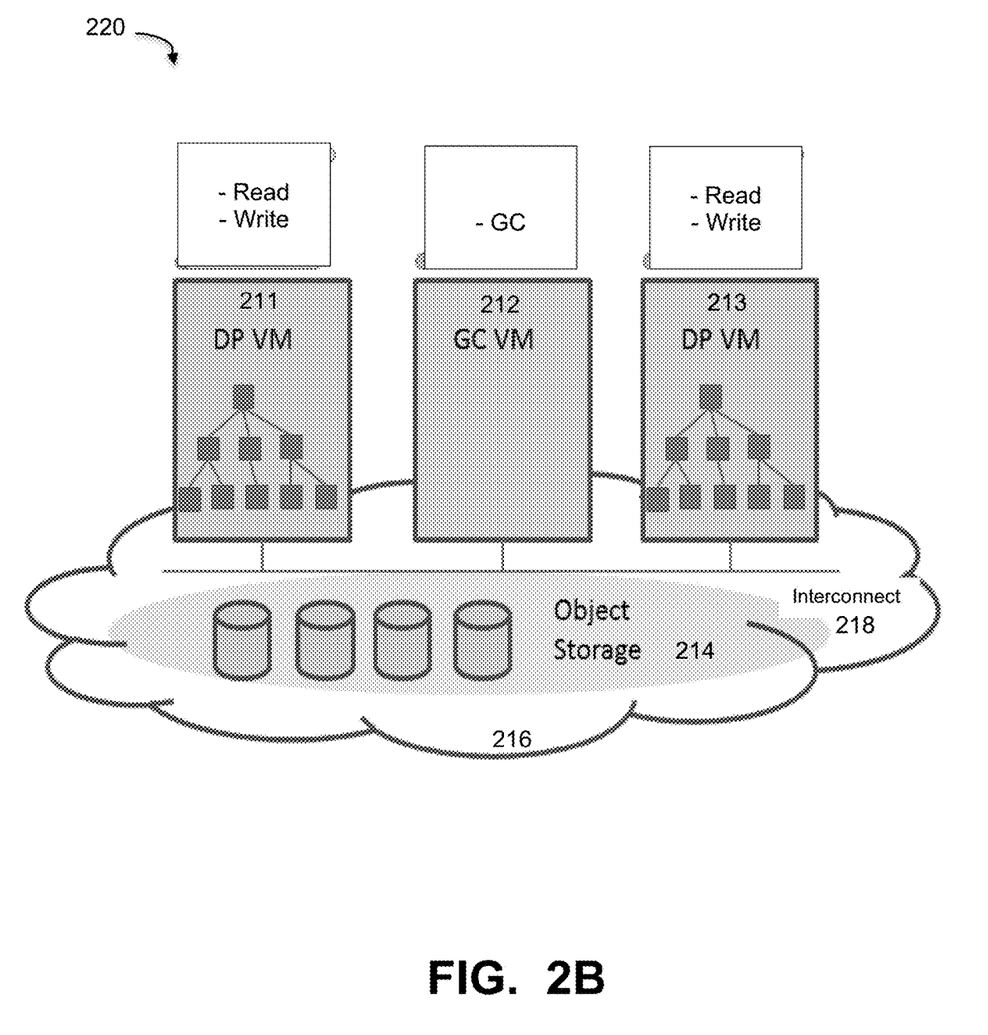
FIG. 2B illustrates the network system of FIG. 2A with a dedicated virtual machine (VM) for garbage collection, under some embodiments.

In an embodiment, a VM configuration (VM CONFIG) process 120 provides separation of garbage collection tasks from the VMs so that not all VMs need to reserve resources for the garbage collection function, and can thus more efficiently utilize their own memory and IOPs resources. This process effectively offloads GC jobs from data protection VMs to separate other VMs, including dedicated GC VMs. FIG. 2B illustrates the network system of FIG. 2A with a dedicated VM for garbage collection, under some embodiments. As shown in FIG. 2B, the example VM deployment may comprise a number of VMs 211-213 coupled to object storage media 214 within cloud network 216. Certain VMs 211 and 213 are configured to perform certain data processing tasks, such as data protection (DP) using deduplicating backup executables. These VMs have normal access and programming control over the data file system, but are tasked to perform only read/write operations. No GC functions need be performed or reserved for these VMs, because at least one VM (e.g., 212) is configured as a dedicated garbage collection VM. This VM performs only garbage functions for the other DP VMs, and does not maintain its own file system. Thus, for the example shown in FIG. 2B, only VM 212 needs VM resources such as memory and IOPs to be reserved for garbage collection.

It should be noted that although the VM CONFIG process 120 is executed as part of the backup management process 112 of the backup server 102, it may be implemented and executed as a process by any other server in system 100, and even by the CSP server 108.

FIG. 2B illustrates an embodiment in which a group of VMs in the cloud are connected to one another through an Ethernet interconnection 218. There are one or more instances of DP VMs and GC VMs in this VM group. The DP VMs (e.g., 211, 213) take user data and persist data into cloud object storage 214. Each DP VM has a file system and owns the data in the file system. With regard to read/write operations, the DP VMs work as presently known by those of ordinary skill in the art. The major distinction is that the DP VMs do not perform garbage collection work by themselves. They are no longer standalone VMs, but instead are connected with the GC VM. The DP VMs share file system metadata with the GC VM, and are notified by the GC VM on data object changes when there are new data objects are created by the garbage collection process, which may remove some dead segments and then re-pack data to new objects.

For optimizing backup performance, some data protection VMs use a special file system that appends data only. The file system is also optimized for deduplication, such that if files have identical data segments, the file system keeps only one copy to save disk space, and metadata is used to map a file with its data segments. However, there is often no metadata for tracking data reference counts in the design, such that when a user deletes files, there are no reference counts for releasing references to data segments, and there is no reverse pointer to indicate to which file a given data segment belongs. This type of file system has a garbage collection (GC) feature that runs as a separate background job to scan all data segments in the file system to find unreferenced data segments and remove them to release disk space. It also re-packs data into new objects in order to make data objects of a similar size, since keeping all objects in as similar a size as possible generally helps performance, and prevents growing metadata due to storing very small objects.

Object storage is typically provided as a service in cloud deployments, meaning that it can be accessed by multiple VMs when credentials and policies apply. This allows the object storage 214 of FIG. 2B to be accessed by one or more specially configured VMs, such as 211 and 213 by providing credentials and policies that indicate that they are dedicated DP VMs and perform no garbage collection themselves. This mechanism makes is possible to offload garbage collection jobs from the DP VMs, and these DP VMs can become much slimmer, i.e., less memory, fewer TOPS and less CPU resources are required for supporting the same capacity.

Figure 3:
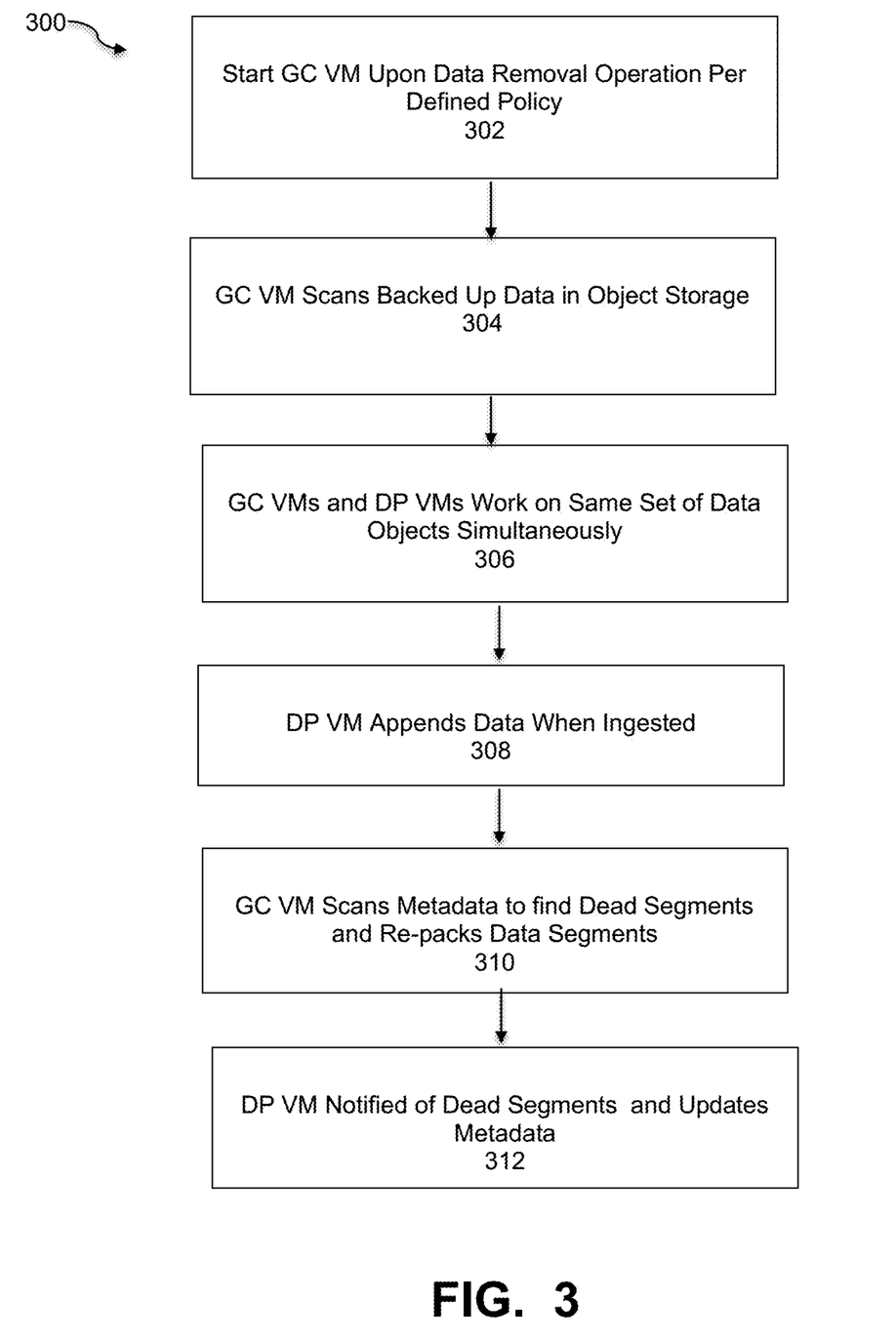
FIG. 3 is a flowchart that illustrates a method of performing garbage collection in a GC VM, under some embodiments.

In an embodiment, the starting of a GC VM is controlled by VM CONFIG process 120. In order to conserve system resources, the GC VM is started on demand only when the GC job is needed. FIG. 3 is a flowchart that illustrates a method of performing garbage collection in a GC VM, under some embodiments. As a preliminary step, certain policies are defined with respect to conditions in which the GC VM is started. These policies define threshold values with respect to data removal (i.e., number of objects, size of objects, frequency of removal, and so on). When there are none or only a few data removing operations, there is generally no need to start the GC VM. Instead, the GC VM is only started upon a data removal operation or operations in accordance with the defined policy, block 302. Thus, when at least some data removing operation are performed, the GC VM can be started and it then scans the backed-up data in the object storage, block 304.

As shown in FIG. 2B, the data protection VMs (e.g., 311 and 313) are configured to perform only read/write operations on the file system. The GC VMs and DP VMs work on the same set of data objects simultaneously and in accordance with certain coordination rules, block 306. In an embodiment, the garbage collection job is performed in the background, while normal file system read/write jobs run at the same time m the DP VMs. This simultaneous action is enabled by certain file systems, such as the EMC Data Domain file system. The DP VM appends data when the user ingests backup data. It packs newly ingested data segments into data objects and writes to object storage in cloud, and does not overwrite data, block 308. When the user deletes files, the files' data segments are not removed. Only the metadata of files are updated to de-reference the data segments. Among the de-referenced data segments, some will become "dead segments" because there are no files referring to them. While some others still live because they are still referenced by other files.

For the garbage collection process, the GC VM scans file metadata and data segments in order to find out which segments are dead segments. It also re-packs data segments into new objects, block 310. The GC VM then notifies the DP VM of the dead objects and the DP VM will erase them later. The DP VM is notified with the new objects as well, and will update the metadata to refer to data segments in the new objects, block 312.

Although FIG. 2B illustrates an example embodiment in which there is one GC VM and two DP VMs, though embodiments are not so limited. Any practical number of VMs may be used in the system, and one GC VM may work for multiple DP VMs, and vice versa. There is not necessarily an optimum fixed ratio of GC VMs to DP VMs, but is rather based on the system constraints and the resource costs imposed by the one or more GC VMs relative to the resource savings realized for the DP VMs by having a certain number of GC VMs deployed.

The DP VMs send persistent data to cloud object storage, and the GC VMs then scan the same object storage for file metadata and data segments. The data access credential of the object storage is stored between multiple DP VMs and GC VMs for each system 220.

As stated above, the GC VM 212 is configured to perform the garbage collection jobs for any number of interconnected DP VMs. The GC VM accesses the object storage and the data written by DP VMs through the appropriate access credentials. Garbage collection is generally used in storage systems that do not overwrite data in place by reclaiming storage that is no longer in use while preserving live data. In deduplicating storage systems as new data is written to a system, duplicate chunks are replaced with references to previously stored data. Deduplication file systems, such as the Data Domain® File System (DDFS) from EMC® Corporation, divide the file system into segments and then group a number of segments into a compression region, which is typically on the order of 64 KB. A DDFS container consists of a metadata section followed by several such compression regions. The metadata section stores the segment references of all segments of all compression regions in that container.

Figure 4:
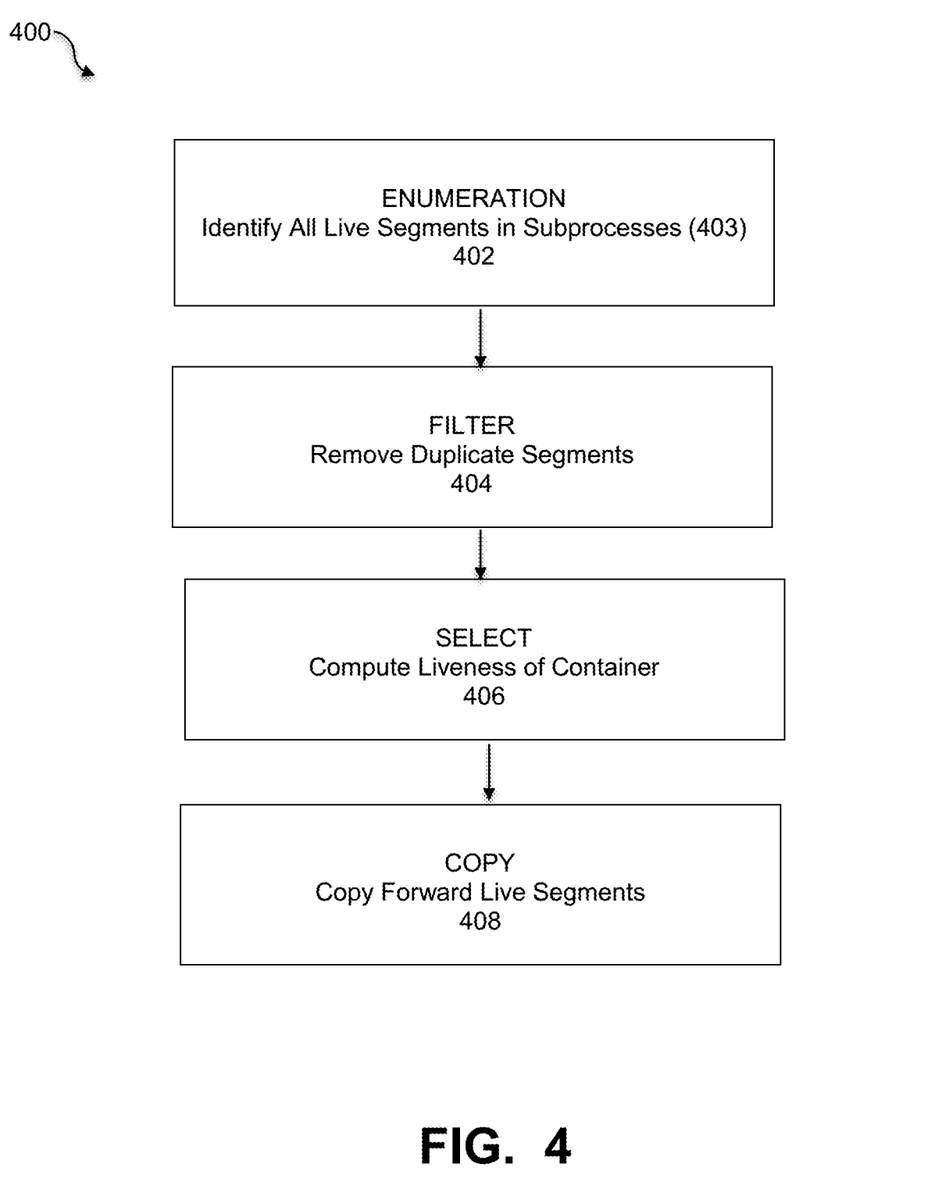
FIG. 4 is a flowchart that illustrates a general garbage collection procedure that is implemented by the VM group of FIG. 2B, under some embodiments.

In an embodiment, the GC VM 212 performs an appropriate garbage collection routine to free unreferenced space in the object storage system. When a file is deleted, blocks referenced from its inodes can be freed immediately by marking a free bitmap or inserting entries into a free list. For deduplicated storage, determining which chunks are referenced has added complexity as a chunk may have numerous references both within a single file and across many files written at various times. FIG. 4 is a flowchart that illustrates a general garbage collection procedure that is implemented by the VM group of FIG. 2B, under some embodiments. The general garbage collection process 400 starts with the enumeration step 402 that identifies all the live segments. The live segments may be identified by certain sub-processes 403 that might include for example, running a mark and sweep operation to free dead space, walking a fingerprint index to create a vector (e.g., a perfect hash vector), and using a live vector to find the live segments, among other substeps. After identifying all the live segments in 402, the process performs a filtering step 404 to remove duplicate segments and preserve the one with highest container ID. It then performs a selection to compute the liveness of each container and determine the cutoff liveness percentage, 406. Once the live segments are sufficiently identified, the process performs a copy step 408 to copy forward the live segments from the selected containers. This process, 400, or a sufficiently similar GC process is implemented for all interconnected DP VMs, by at least GC VM 212 in FIG. 2B.

FIG. 4 illustrates a general garbage collection process, and embodiments are not so limited. Other or different steps may be performed in addition or instead of those shown. For example, certain merge, pre-merge, pre-filtering, pre-selection, and other steps may also be performed depending on the configuration and constraints of the deduplication process and object storage system.

As can be seen in FIG. 2B, embodiments include a group of VMs that are interconnected and coordinated so that one VM can perform the garbage collection tasks for all the other DP VMs. The interconnection 218 between the DP VMs and GC VMs (which may comprise multiple direct and indirect physical and/or virtual interconnections) is setup when any of the VMs is started or restarted. The VMs 211-213 form a simple cluster that aims to share necessary information between DP VMs and GC VMs.

In an embodiment, the interconnection is based on one or a set of data access credentials. The GC VM 212 needs to get the data access credential from each DP VM in order to perform garbage collection for that DP VM. In the case where one GC VM works for multiple DP VMs, it needs to get credentials from all these multiple DP VMs as well. In an embodiment, the credentials are passed and managed in a securely using a defined credential messaging protocol. Any appropriate credential management and exchange system for establishing and exchanging credentials over network connections may be used. Once the GC VM establishes credentials for each respective DP VM, it has access to the metadata of the file system. The GC VM thus gets the information of the file system metadata, for example, files and their data segments.

Figure 5:
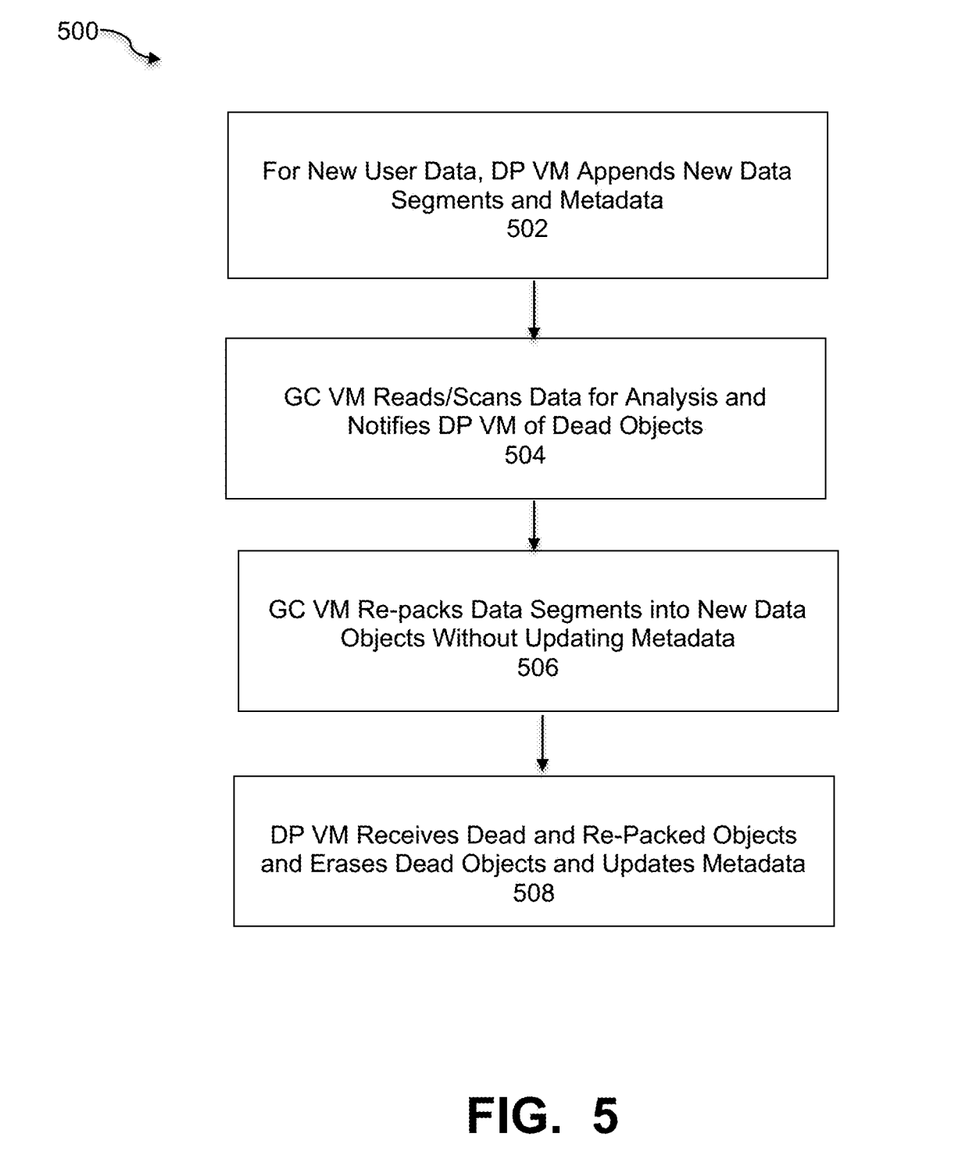
FIG. 5 is a flowchart that illustrates a method of resolving data and metadata access contention between DP VMs and GC VMs, under some embodiments.

With respect to the DP VM to GC VM coordination, as described above, the GC VM scans the file system containers for dead segments and re-packs some live data segments into new objects. These operations should notify each corresponding DP VM that owns the data. In an embodiment, data and metadata access contention between DP VM and GC VM is resolved through the method shown in FIG. 5. As shown in process 500, when new user data is written, the DP VM appends new data segments and also the metadata, 502. Overwrites are minimized in this type of file system. When the GC VM works on the data, it mostly read/scan the data for analysis purposes. When dead segments are found, the GC VM does not erase them; instead, it notifies the DP VM about the dead segments and dead objects, 504. In the case of re-packing the data segments into new data objects, the GC VM will create new data objects but does not update metadata to update file references. Instead, it notifies the DP VM of the new objects, 506. The DP VM gets the dead objects and newly re-packed objects from the GC VM. It then erases the dead objects and updates the metadata to refer to the new objects, 508. Because the DP VM takes on the role of erasing objects and updating the metadata during the garbage collection process while the GC VM just performs scan/report/create operations without erasing/updating the data, the DP VM and GC VM are well coordinated to avoid contention.

In certain use cases, one or more VMs in the system may fail, such as through a VM panic. When a DP VM or GC VM fails, the rest of the VMs and their services in the cluster will not be impacted. If a GC VM fails, before it is restarted by the cloud infrastructure, the DP VMs continue with their normal data services. If a DP VM fails, the GC VM goes ahead with the garbage collection work. There may be certain exceptions. For example, each DP VM may have some quota in cloud object storage. When the capacity goes close to the quota limit, it then relies on the GC VM to remove dead data segments to free space. Therefore, alerts are sent when the GC VM fails and must be restarted. The group of DP VMs and GC VMs should be able to run heartbeats between VMs. Alerts are sent to the system administrator whenever there are VM failures. Standard VM clustering protocols may be used to address VM failure conditions and alerts.

Several advantages are realized by the CC VM process of FIG. 3. For example, the GC VM process reduces VM costs in cloud, since the GC VM is started only when a GC job is needed, and it will not be charged if not started. In some usage scenarios where there is relatively little data removing operations, one CC VM may work for many multiple DP VMs, Without their own garbage collection overhead, the DP VMs require less memory/IOPS/CPU, which can greatly reduce the cost per VM/capacity unit. It is also easier to scale capacity per OP VM. A DP VM with the same size of memory/CPU and LOPS capability is able to support more deduplication capacity because there are notable resources freed from GC jobs. It is also easier to deploy DP VMs and facilitate microservices as smaller size VMs are friendlier to deployment and microservices.

The VM CONFIG process 120 also enhances the efficiency of I/O performance. In a DP VM where read/write and GC workloads share the same I/O path in one system, there is an impact with each other if looking from the I/O performance and OS scheduling view. This is especially true in the case where garbage collection is urgently needed for freeing disk space. By separating the GC workload to another VM, this contention inside one VM is gone. It is also easier to scale network bandwidth on VMs with lower costs. For example, with one popular cloud service provider (e.g., AWS), a VM's virtual NICs share 90 MB bandwidth. More virtual NICs on a VM do not help scale network bandwidth because they share the same 90 MB. The provider may provide an SR-IOV type virtual NIC for more bandwidth, but it is much more expensive. VM access object storage also consumes Ethernet bandwidth. By offloading garbage collection jobs to the GC VM, the network bandwidth for accessing object storage is also offloaded.

System Implementation

Embodiments of the processes and techniques described above can be implemented on any appropriate backup system operating environment or file system, or network server system. Such embodiments may include other or alternative data structures or definitions as needed or appropriate.

Figure 6:
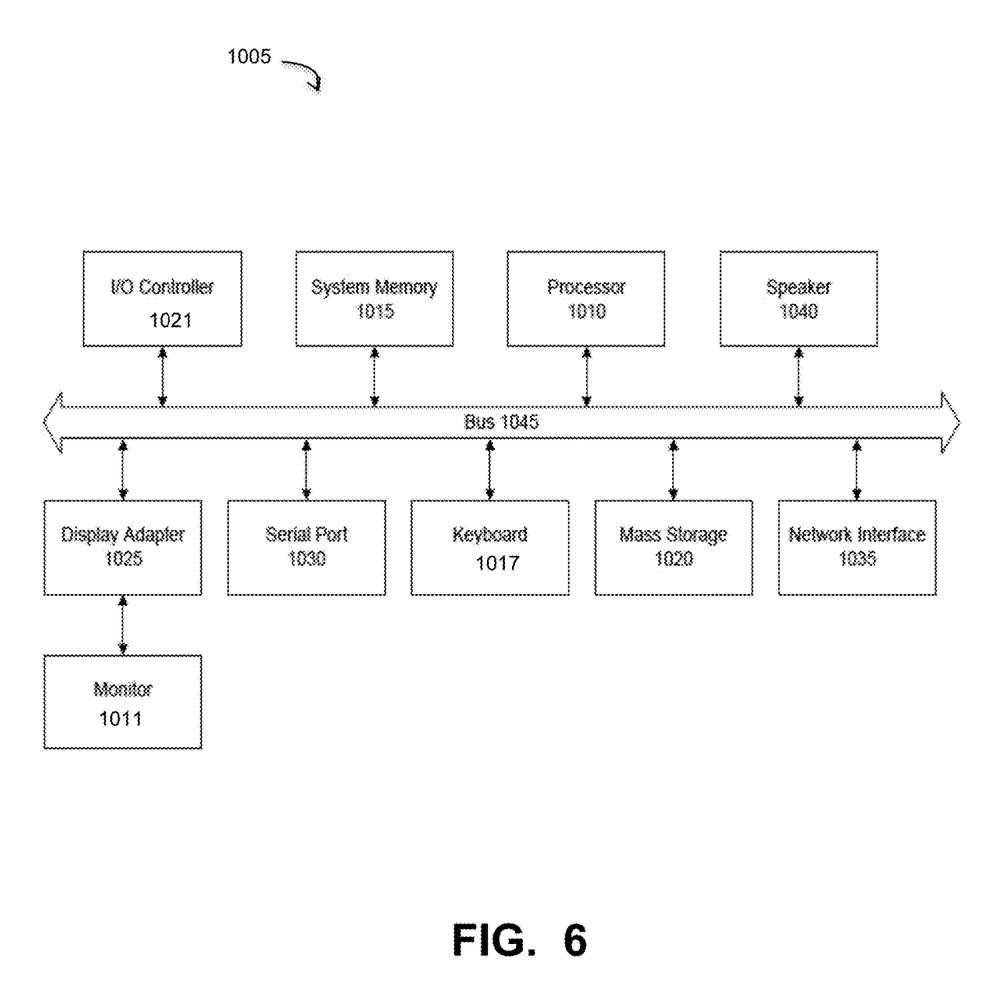
FIG. 6 is a system block diagram of a computer system used to execute one or more software components of a VM configuration process for garbage collection of DP VMs, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
configuring at least one virtual machine (VM) of a plurality of virtual machines in a VM cluster to be a data protection virtual machine (DP VM);
allowing access by the DP VM to object storage through credentials and policies indicating that the DP VM is dedicated to read and write operations for deduplicating backup tasks and the DP VM does not perform garbage collection itself;
interconnecting a garbage collection VM (GC VM) of the VM cluster to the DP VM, wherein the GC VM is configured to perform garbage collection tasks for the DP VM and the GC VM does not maintain its own file system;
starting the GC VM upon a data removal operation meeting threshold values defined in one or more policies for data removal;
transferring access credentials from the DP VM to the GC VM through a defined credential messaging protocol to allow sharing file system metadata between the DP VM and the GC VM;
storing, by the DP VM, persistent data to the object storage;
scanning, by the GC VM, the object storage to perform garbage collection tasks for the DP VM, wherein the garbage collection tasks include identifying dead segments that are data that have no files referring thereto, and identifying data segments that need to be re-packed into new data objects and creating the new data objects;
notifying the DP VM by the GC VM of the dead segments and the new data objects created as a result of the re-packing; and
erasing the dead segments and updating metadata to reference the new data objects by the DP VM.

2. The method of claim 1 further comprising:
updating metadata of user deleted files to de-reference data segments in the deleted files, wherein data segments of the de-referenced data segments that have no files referring thereto comprise the dead segments.

3. The method of claim 1 wherein the VM cluster is maintained in a cloud computing network provided by a cloud service provider to a user of the DP VM, and wherein separation of garbage collection tasks of the GC VM from data protection tasks of the DP VM are performed by a VM configuration operation of a backup management process providing data protection.

4. The method of claim 3 wherein data accessed by the DP VM and GC VM comprises data segments stored as objects and referenced by unique object identifiers (IDs) in an object storage system, and wherein the threshold values defined in one or more policies for data removal include a number of data objects, size of data objects, and removal frequency.

5. The method of claim 4 wherein the GC VM performs the garbage collection tasks using file system metadata for files and associated data segments for the DP VM.

6. The method of claim 1 wherein the DP VM of the VM cluster comprises a plurality of DP VMs wherein each DP VM of the plurality of DP VMs is configured the same way as the DP VM.

7. The method of claim 1 wherein the DP VM performs a deduplication process for backing up data as part of the data protection.

8. The method of claim 4 wherein the GC VM is started by a VM configuration process executed on a server computer at run-time of the deduplication.

9. The method of claim 8 further comprising:
appending data in a respective DP VM when a user ingests back up data;
packing newly ingested data segments into data objects;
writing the data objects to object storage coupled to the VM cluster, wherein old data for the newly ingested data is not overwritten; and
updating corresponding metadata for the dead segments.

10. The method of claim 9 further comprising:
scanning, in the GC VM, file metadata and data segments to find and identify the dead segments; and
updating the metadata to refer to the re-packed data segments in the new data objects.

11. The method of claim 7 wherein the deduplication process is executed in a deduplication backup system comprising a Data Domain file system (DDFS).

12. A deduplication backup system performing comprising:
a server hardware component configuring at least one virtual machine (VM) of a plurality of virtual machines in a VM cluster to be a data protection virtual machine (DP VM) that is allowed access to object storage through credentials and policies indicating that the DP VM is dedicated to read and write operations for deduplicating backup tasks and the DP VM does not perform garbage collection itself; and
a hardware interconnection coupling a garbage collection VM (GC VM) of the VM cluster to the DP VM and configured to:
perform, by the GC VM, garbage collection tasks for the DP VM, wherein the GC VM does not maintain its own file system, and is started upon a data removal operation meeting threshold values defined in one or more policies for data removal, and wherein access credentials are transferred from the DP VM to the GC VM through a defined credential messaging protocol to share file system metadata between the DP VM and the GC VM,
store, by the DP VM, persistent data to object storage, scan, by the GC VM, the object storage to perform garbage collection tasks for the DP VM, wherein the garbage collection tasks include identifying dead segments that are data that have no files referring thereto, and identifying data segments that need to be re-packed into new data objects and creating the new data objects,
notify the DP VM by the GC VM of the dead segments and the new data objects created as a result of the re-packing, and
erase the dead segments and updating metadata to reference the new data objects by the DP VM.

13. The system of claim 12 wherein the VM cluster is maintained in a cloud computing network provided by a cloud service provider to a user of the DP VM, and wherein data accessed by the DP VM and GC VM comprises data segments stored as objects and referenced by unique object identifiers (IDs) in an object storage system.

14. The system of claim 13 wherein the GC VM is started by the server hardware component at run-time of a deduplication process.

15. The system of claim 14, wherein the GC VM is configured to not erase the dead segments but allow erasing of the dead segments by the DP VM, and wherein a respective DP VM is configured to:
append data when a user ingests back up data;
pack newly ingested data segments into data objects;
write the data objects to object storage coupled to the VM cluster, wherein old data for the newly ingested data is not overwritten; and
update corresponding metadata for the dead segments.

16. The system of claim 15, wherein upon the notification of the respective DP VM by the GC VM, the DP VM is further configured to:
update the metadata to refer to the re-packed data segments in the new data objects.

17. The system of claim 16 wherein the threshold values defined in one or more policies for data removal include a number of data objects, size of data objects, and removal frequency.

18. A computer program product, comprising a non-transitory computer-readable medium having a computer-readable program code embodied therein, the computer-readable program code adapted to be executed by one or more processors to implement a method of configuring virtual machines for garbage collection in a deduplication backup system executed on a server computer in a cloud computing network, by:
configuring at least one virtual machine (VM) of a plurality of virtual machines in a VM cluster to be a data protection virtual machine (DP VM);
allowing access by the DP VM to object storage through credentials and policies indicating that the DP VM is dedicated to read and write operations for deduplicating backup tasks and the DP VM does not perform garbage collection itself;
interconnecting a garbage collection VM (GC VM) of the VM cluster to the DP VM, wherein the GC VM is configured to perform garbage collection tasks for the DP VM and the GC VM does not maintain its own file system;
starting the GC VM upon a data removal operation meeting threshold values defined in one or more policies for data removal;
transferring access credentials from the DP VM to the GC VM through a defined credential messaging protocol to allow sharing file system metadata between the DP VM and the GC VM;
storing, by the DP VM, persistent data to the object storage;

scanning, by the GC VM, the object storage to perform garbage collection tasks for the DP VM, wherein the garbage collection tasks include identifying dead segments that are data that have no files referring thereto, and identifying data segments that need to be re-packed into new data objects and creating the new data objects;

notifying the DP VM by the GC VM of the dead segments and the new data objects created as a result of the re-packing; and erasing the dead segments and updating metadata to reference the new data objects by the DP VM.

\* \* \* \* \*